(12) United States Patent
Wang et al.

(10) Patent No.: US 8,540,601 B2
(45) Date of Patent: Sep. 24, 2013

(54) HYBRID POWER OUTPUT SYSTEM

(75) Inventors: Chuanfu Wang, Guangdong (CN);
Hongbin Luo, Guangdong (CN); Wei Chen, Guangdong (CN); Xiaohua Tang, Guangdong (CN); Youchuan Song, Guangdong (CN); Xuguang Zhou, Guangdong (CN); Huanguang Chen, Guangdong (CN); Jianhua Zhang, Guangdong (CN); Yunhao Liao, Guangdong (CN)

(73) Assignee: BYD Co. Ltd., Shenzhen (CN)

( * ) Notice: Subject to any disclaimer, the term of this patent is extended or adjusted under 35 U.S.C. 154(b) by 391 days.

(21) Appl. No.: 12/518,206

(22) PCT Filed: Dec. 6, 2007
(Under 37 CFR 1.47)

(86) PCT No.: PCT/CN2007/071191
§ 371 (c)(1),
(2), (4) Date: Jun. 8, 2009

(87) PCT Pub. No.: WO2008/092353
PCT Pub. Date: Aug. 7, 2008

(65) Prior Publication Data
US 2010/0282530 A1   Nov. 11, 2010

(30) Foreign Application Priority Data

Dec. 8, 2006  (CN) .......................... 2006 1 0157389

(51) Int. Cl.
*B60W 10/02* (2006.01)
*B60K 6/42* (2007.10)

(52) U.S. Cl.
USPC ........................................ 477/5; 180/65.22

(58) Field of Classification Search
USPC ................... 180/65.21, 65.22; 477/3, 5, 6, 8; 701/67; 475/5
See application file for complete search history.

(56) References Cited

U.S. PATENT DOCUMENTS 5,845,731 A * 12/1998 Buglione et al. ........... 180/65.23
6,146,302 A * 11/2000 Kashiwase ........................ 475/5

(Continued)

FOREIGN PATENT DOCUMENTS

| CN | 1618643 A | 5/2005 |
|---|---|---|
| JP | 2003018708 A | 1/2003 |
| JP | 2005119573 A | 5/2005 |

OTHER PUBLICATIONS

International Search Report dated Dec. 18, 2007 for PCT Publication No. PCT/CN2007/071191.

Primary Examiner — J. Allen Shriver, II
Assistant Examiner — James M Dolak
(74) Attorney, Agent, or Firm — Brinks Hofer Gilson & Lione (57) ABSTRACT

The present invention discloses a hybrid power output system for outputting the power to the wheel driving shaft, comprising an engine, a first motor, a second motor, a battery, a first clutch, a second clutch and a constant-mesh fixed ratio reduction unit, wherein the first motor and the second motor are connected electrically with the battery; the engine is connected to the first motor via the first clutch; the first motor is connected to the second motor via the second clutch; the second motor is connected to the wheel driving shaft via the constant-mesh fixed ratio reduction unit. This hybrid power output system can enhance the comfort of the vehicle, save the space and reduce the cost, moreover, it can realize multiple drive modes to improve the power efficiency and reduce the fuel consumption.

13 Claims, 8 Drawing Sheets

(56) References Cited

U.S. PATENT DOCUMENTS

| | | | |
|---|---|---|---|
| 6,203,468 B1 * | 3/2001 | Nitta et al. | 477/5 |
| 6,600,980 B1 | 7/2003 | Kraska et al. | |
| 6,726,592 B2 | 4/2004 | Kotani | |
| 7,053,566 B2 * | 5/2006 | Aizawa et al. | 318/34 |
| 7,252,619 B2 * | 8/2007 | Tabata et al. | 477/3 |
| 7,490,685 B2 * | 2/2009 | Aoki et al. | 180/65.28 |
| 7,549,945 B2 * | 6/2009 | Shibata et al. | 477/5 |
| 7,559,388 B2 * | 7/2009 | Severinsky et al. | 180/65.28 |
| 7,578,765 B2 * | 8/2009 | Tabata et al. | 477/5 |
| 7,597,164 B2 * | 10/2009 | Severinsky et al. | 180/65.27 |
| 7,597,648 B2 * | 10/2009 | Conlon et al. | 477/4 |
| 7,650,956 B2 * | 1/2010 | Hirata et al. | 180/248 |
| 7,661,495 B2 * | 2/2010 | Zohrer et al. | 180/65.22 |
| 7,708,095 B2 * | 5/2010 | Hirata | 180/65.275 |
| 7,762,365 B2 * | 7/2010 | Iwanaka et al. | 180/65.22 |
| 7,908,063 B2 * | 3/2011 | Sah | 701/51 |
| 7,975,791 B2 * | 7/2011 | Nozaki et al. | 180/65.6 |
| 8,152,667 B2 * | 4/2012 | Shibata et al. | 475/5 |
| 8,235,853 B2 * | 8/2012 | Lutoslawski | 475/5 |
| 8,307,924 B2 * | 11/2012 | Wang et al. | 180/65.23 |

* cited by examiner

HYBRID POWER OUTPUT SYSTEM

CROSS-REFERENCE TO RELATED APPLICATIONS

This application is a national phase application of PCT Application No. PCT/CN2007/071191, filed Dec. 6, 2007, which claims priority from Chinese Patent Application No. 2006-10157389.6, filed Dec. 8, 2006, both contents of which are incorporated herein by reference in their entirety.

TECHNICAL FIELD

The present invention relates to a hybrid power output system, and more particularly to a hybrid power system for outputting the power to the wheel driving shaft to propel the vehicle.

BACKGROUND

The hybrid vehicle generally has two different power sources simultaneously. According to the various connection types, it may be mainly divided into three structures of series hybrid, parallel hybrid and series-parallel hybrid.

The series hybrid is characterized in electrically coupled, wherein the engine directly drives an electric generator for charging the battery, and then an electric motor is operated by electrical energy from the battery to drive the wheels. The parallel hybrid is characterized in mechanically coupled, wherein the engine is connected with the driving shaft, and the motor can be selectively operated as an electric motor or a electric generator for balancing the loads of the engine.

In the prior art, one of the series-parallel hybrid may use a planetary gear unit to realize the distribution of power among the driving units. In this structure, the engine may be connected to the carrier of the planetary gear unit, a part of the power of the engine is transferred into the electrical energy by means of the first motor for furnishing the electrical energy to the second motor or for charging the battery, and the other part of the power of the engine is directly transmitted to the ring gear of the planetary gear unit; meanwhile, the second motor is connected with the ring gear for the supply of some supplementary power or torque. In this structure, a part of the power output from the engine is always used to power the first motor to generate the electrical energy for charging the battery or for driving the second motor.

In the prior art, a series-parallel hybrid may use the clutch to realize the power distribution among the driving units. For example, the Chinese patent CN 1200824 C discloses a hybrid power drive system for propelling the vehicle, which comprises two clutches, two motors and a battery, wherein the first clutch and the second clutch are respectively disposed between the first motor, the second motor and the internal combustion engine, the second motor is permanently connected to a variable-ratio transmission, and the first motor and the second motor are connected electrically with the battery. As it can be seen from the disclosure, the first motor of the drive system has three functions as below: (1) starting motor for the internal combustion engine; (2) generator for outputting electrical energy; and (3) drive device for driving the transmission hydraulic pump and other auxiliaries such as an air conditioner compressor, a power steering pump. Thus it can be seen that, the first motor is equal to a starting motor (with lower power or capacity) for the internal combustion engine in a conventional vehicle, except that it is electrically connected with the battery, and under control, it has some other functions besides to start the internal combustion engine, for example, to drive some auxiliaries. Moreover, the second motor can be used in a purely electrical operation only when the vehicle is starting from the rest or is driving at a low speed. When a higher torque is needed, the engine must be started to propel the vehicle alone or together with the second motor. In light of the performances and functions of the first motor and the second motor as mentioned above, the whole drive system is limited in designs and functions. On the one hand, the second motor must be permanently connected with a variable ratio transmission to efficiently output the power, that is, the deficiencies of the second motor in function and output capacity must be compensated by changing the various shifts of the transmission; moreover, during the changing of shifts, the power transmission to the wheels will be interrupted, which may reduce the comfort of the vehicle. On the other hand, when the first motor fails to supply sufficient torque for starting the internal combustion engine, and the second motor is used for starting the internal combustion engine, the variable ratio transmission must be in neutral so that the second motor and the wheels must be under the no-torque transmission condition, otherwise, the second motor will also, via the transmission, drive the wheels to rotate (when the vehicle is at rest, if the transmission is not in neutral, the second motor can not start the internal combustion engine). Since the variable-ratio transmission must be used, the drive system will occupy more space on the vehicle and the cost will be increased.

As mentioned above, due to the limitation in function of the first motor, the first motor can't be operated for driving the wheels alone, and unsuitable for driving the wheels together with the second motor, thus the drive system only has some simple drive modes and functions. For various traveling conditions of the vehicle, the drive system can't provide the optimum power output for multiple-functions and multiple-modes driving, thus the power efficiency is not optimized, and the optimized power output and reduction of fuel consumption can not be realized.

SUMMARY OF THE INVENTION

Accordingly, the present invention aims to provide a hybrid power output system, which can realize the high efficiency power output without a variable ratio transmission, and can improve the comfort of the vehicle, save the space and reduce the cost, and also can realize multiple drive modes to improve the power efficiency and reduce the fuel consumption.

In order to achieve the purpose mentioned above, according to one aspect of the present invention, a hybrid power output system is provided, which comprises an engine, a first motor, a second motor, a battery, a first clutch, a second clutch and a constant-mesh fixed ratio reduction unit, wherein the first motor and the second motor are connected electrically with the battery; the engine is connected to the first motor via the first clutch; the first motor is connected to the second motor via the second clutch; the second motor is connected to a wheel driving shaft via the constant-mesh fixed ratio reduction unit.

Since the fixed ratio reduction unit is a constant-mesh reduction unit, and the second motor is connected to the wheel driving shaft via the constant-mesh reduction unit, the power output from the motor to the wheel driving shaft will not be interrupted due to change of shifts, and therefore the motor can be operated at a higher efficiency, and the speed of the vehicle will not be discontinuous during the traveling of the vehicle. The comfort of the vehicle can also be improved. Moreover, since the operation and control for changing shifts is not required, the power output system is easier to be operated and controlled. Moreover, since it is not needed to leave a large space on the vehicle to install the large sized transmission, the space arrangement of the power output system can be optimized, and the cost also can be reduced.

Preferably, the engine, the first clutch, the first motor, the second clutch, and the second motor may be connected or arranged in sequence and coaxially.

In this arrangement, the output shaft of the engine is arranged coaxially with the rotary shafts of the first motor and the second motor, and mechanically connected via the first clutch and the second clutch. Thus, the driving units of the power output system may be compactly arranged on the vehicle, and be easier to be integrated or installed. Furthermore, since all the driving units are coaxial, no special means is required for transmissions of mechanical energy (such as gear systems among the different rotating shafts), and the loss of energy during transmission is minimized, and therefore the efficiency of the power output system is increased.

Preferably, the first motor may be designed as a mid-speed or high-speed motor, while the second motor may be designed as a mid-speed or low-speed motor.

The first motor is designed as a mid-speed or high speed motor, that is, its efficiency at a high rotary speed is higher than that at a low rotary speed. The second motor is designed as a mid-speed or low-speed motor, that is, its efficiency at a low rotary speed is higher than that at a high rotary speed. Thus, the first motor and the second motor can meet the requirements of the wheels for torque and rotary speed by cooperating at the optimum efficiency. Moreover, the design difficulties (the difficulties for designing a motor which has a high efficiency at full speeds including the low-speed, mid-speed and high-speed) for both motors can be reduced.

Thus, the first motor and the second motor can be cooperated to drive the wheels, and each can be worked in a higher efficiency, such that the efficiency of the whole drive system can be increased substantially. For example, during the starting from the rest or the traveling at a low speed, the higher efficient second motor may be operated to drive the wheels alone; when the speed is up to a specified value at which the first motor can work at a higher efficiency, the first motor may be operated to drive the wheels alone; and when the speed is moderate, the first and the second motors may be cooperated at a higher efficiency for driving the wheels together. If a higher traction torque is required, the first and the second motors can be operated to drive the wheels together. Since both motors can be operated to drive the wheels together to furnish a higher torque, the two motors may be designed relatively smaller, such that the whole power output system can be arranged on the vehicle more easily and compactly.

Thus, during such a purely electrical operation, the power output system will also have an excellent power output capacity to meet the requirements for propelling the vehicle, even though the internal combustion engine is not started.

Furthermore, the first motor being designed as a mid-speed or high-speed motor, may realize the higher efficient generation of electricity. For example, when the first motor is used as a generator for charging the battery, the engine can be operated in a higher efficiency, and the rotary speed of the crankshaft of the engine equals to the mid-speed or high-speed of the motor. Therefore, during the charging of battery with the engine driving the first motor, both the engine and the first motor may be operated at their higher efficiency, thus the efficiency of the whole power output system is improved.

According to another aspect, the present invention provides a hybrid power output system, which comprises an engine, a first motor, a second motor, a battery, a first clutch and a second clutch, the first motor and the second motor are connected electrically with the battery; the engine is connected to the first motor via the first clutch; the first motor is connected to the second motor via the second clutch; the first motor is designed as a mid-speed or high-speed motor, the second motor is designed as a mid-speed or low-speed motor.

According to this technical solution, the first motor and the second motor may be designed such that the two motors can be cooperated to realize multiple operation modes at various conditions of the vehicle, and both motors can be operated at their higher efficiency, thus the whole drive system can be operated at a higher efficiency and a lower fuel consumption.

The present invention is simple in structure, has a higher efficiency in power output and can realize multiple operation modes, greatly improves the fuel consumption and reduces the emission of pollutants.

The other features and advantages of the present invention will be further described below with reference to the attached drawings.

DETAILED DESCRIPTION OF CERTAIN INVENTIVE EMBODIMENTS

The embodiments of the present invention will now be described in detail with reference to the accompanying drawings.

Figure 1:
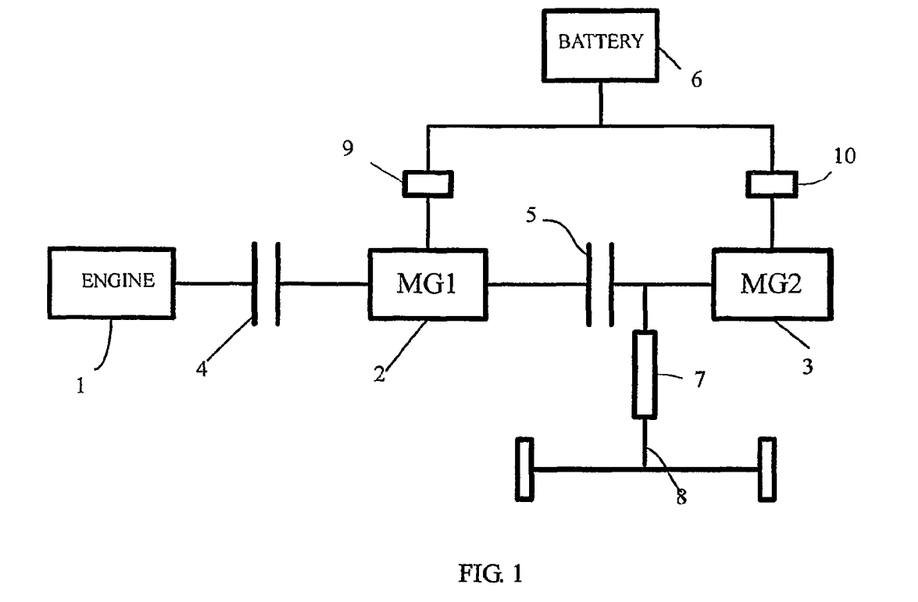
FIG. 1 is a schematic view illustrating a hybrid power output system of the present invention.

Referring to FIG. 1, it is a schematic view illustrating a preferred hybrid power output system according to the present invention. The system is used to output the power to the wheel driving shaft and the wheels so as to propel the vehicle. This hybrid power output system comprises an engine 1, a first motor 2, a second motor 3, a battery 6, a first clutch 4, a second clutch 5 and a constant-mesh fixed ratio reduction unit 7, wherein the first motor 2 and the second motor 3 are connected electrically with the battery 6; the engine 1 is connected to the first motor 2 via the first clutch 4; the first motor 2 is connected to the second motor 3 via the second clutch 5; the second motor 3 is connected to the wheel driving shaft 8 via the constant-mesh fixed ratio reduction unit 7.

The fixed ratio reduction unit 7 may be a constant-mesh gear-drive reduction unit, a constant-mesh chain-drive reduction unit, or a constant-mesh friction-drive reduction unit, etc, so long as the reduction ratio is kept constantly or fixed when the speed is reduced.

As shown in FIG. 1, the engine 1, the first clutch 4, the first motor 2, the second clutch 5, and the second motor 3 are connected in sequence and coaxially, that is, the rotating shafts of the first motor 2 and the second motor 3 are arranged coaxially with the output shaft of the engine 1. The output shaft of the engine 1 is connected with the rotating shaft of the first motor 2 via the first clutch 4, the rotating shaft of the first motor 2 is connected with the rotating shaft of the second motor 3 via the second clutch 5, and the constant-mesh fixed ratio reduction unit 7 may be arranged between the second clutch 5 and the second motor 3.

Both the first motor 2 and the second motor 3 are functional as motors or generators. The battery 6 is a controllable energy storage means, which may be a secondary battery or fuel battery, etc. The first motor 2 and the second motor 3 are respectively connected with the battery 6 through the first power converter 9 and the second power converter 10, the first power converter 9 and the second power converter 10 may have the bi-directional power conversion, thus, through the conversion of power switching unit, both motors may convert the electrical energy stored in the battery 6 into the power output, and it may also convert the power into the electrical energy for storing in the battery 6.

As shown in FIG. 1, when the engine 1 is required to start, the first motor 2 is coupled with the output shaft of the engine 1 via the engaged first clutch 4, and receives electrical energy from the battery 6 to produce adequate torque for starting the engine 1. When the battery 6 is required to be recharged, the first motor 2 may also generate electrical energy to charge the battery 6 under the driving of the engine 1. The first motor 2 may be designed as a mid-speed or high-speed motor for starting the engine 1 alone, and it may be also used for propelling the vehicle alone with purely electrical energy.

The second motor 3 may be designed as a mid-speed or low-speed motor, which has the power capacity higher than that of the first motor 2, and mainly used to propel the vehicle with purely electrical energy when the engine 1 is stopped or disconnected. When the second motor 3 cannot provide adequate torque to meet the requirement for propelling the vehicle, the first motor 2 can be operated together with the second motor 3 for propelling the vehicle with purely electrical energy.

The higher efficiency range of the engine is usually at the relatively high rotary speed. Thus, during the vehicle is accelerating from the rest to the relatively high speed, the motor is used for electrically propelling the vehicle, while the engine is not required for propelling. Therefore, the engine can be avoided to operate in a low efficiency range, which may cause high consumption of fuel and high emission of pollutants.

When the first motor 2 together with the second motor 3 are used for electrically propelling the vehicle, the second clutch 5 shall be switched to be engaged. The first motor 2 and the second motor 3 can be operated to be at a substantially same speed, and then the second clutch 5 is operated to engage. During the low speed condition of the vehicle, the first motor 2 and the second motor 3 are able to provide adequate torque to meet the requirement for heavy load of the vehicle, and the engine is not required for such a heavy load, and therefore the engine is avoided to work in a low efficiency range.

As shown in FIG. 1, the present invention may be operated in the modes of purely electrical energy operation, purely engine operation, series-hybrid operation, parallel-hybrid operation and series-parallel operation.

With reference to FIG. 2 to FIG. 10, the different operation modes of the present hybrid power output system will be described as below. In the attached drawings, the constant-mesh fixed ratio reduction unit 7 is omitted for simplifying purpose.

Figure 2:
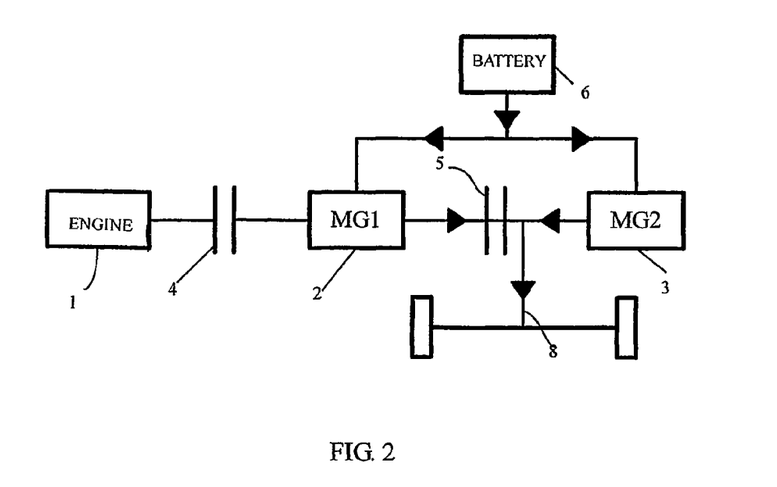
FIG. 2 to FIG. 12 are views illustrating the various power output modes of the present hybrid power output system.
Figure 3:
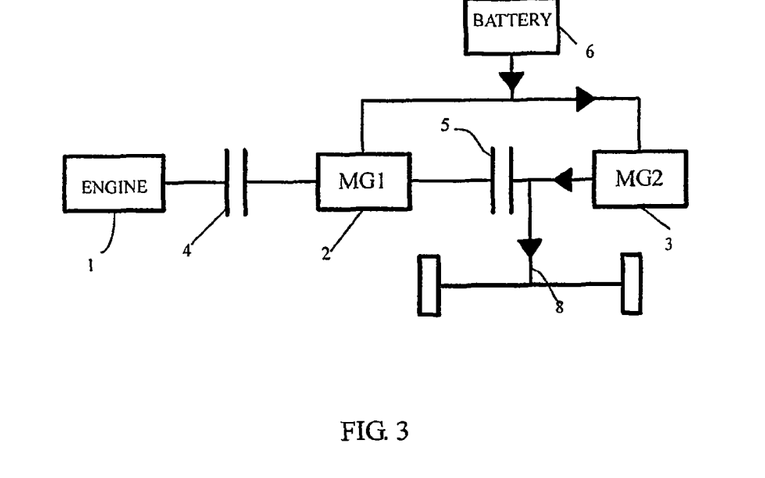
Figure 4:
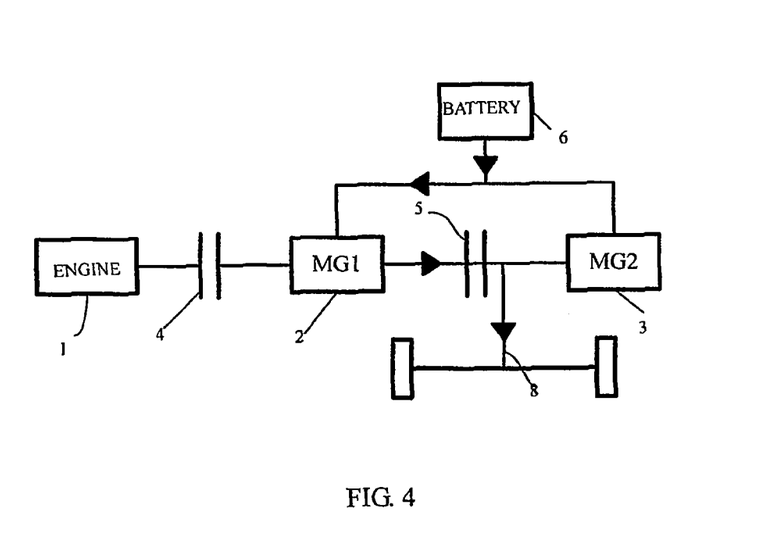

FIG. 2, FIG. 3 and FIG. 4 are the views illustrating that the driving shaft 8 is only driven based on the power output of the motor(s), which is the so-called purely electrical energy operation mode of the hybrid power system, that is, the engine 1 is out-of-work, only the motor is used for propelling the vehicle.

During this mode, the engine 1 is out-of-work, the first clutch 4 is disengaged, and the power may be flowed in three different manners, as shown in FIG. 2, FIG. 3 and FIG. 4 respectively.

As shown in FIG. 2, it shows the operation mode in which both the first motor 2 and the second motor 3 are operated for propelling the driving shaft 8, at this time the second clutch 5 is engaged. Thus, the rotating shafts of both motors may simultaneously transfer the torque to the driving shaft 8; the first motor 2 and the second motor 3 work under the electrical energy operation mode, the battery 6 provides the electrical energy to both motors. As indicated by the arrow in FIG. 2, the battery 6 provides the electrical energy to the first motor 2 and the second motor 3, and then the latter may output the torque to the driving shaft 8. In fact, the first motor 2 and the second motor 3 output the torque to the driving shaft 8 through the fixed ratio reduction unit 7; however, because the fixed ratio reduction unit 7 is omitted here, no additional description is given for simplifying purpose.

As shown in FIG. 3, it shows the operation mode in which only the second motor 3 is operated to propelling the vehicle, at this time, the second clutch 5 is disengaged, the first motor 2 is out-of-work, the second motor 3 is operated under battery power, the battery 6 provides the electrical energy for the second motor 3. As indicated by the arrow in FIG. 3, the battery 6 provides the electrical energy to the second motor 3, and the second motor 3 output the torque to the driving shaft 8 through the fixed ratio reduction unit 7.

Figure 5:
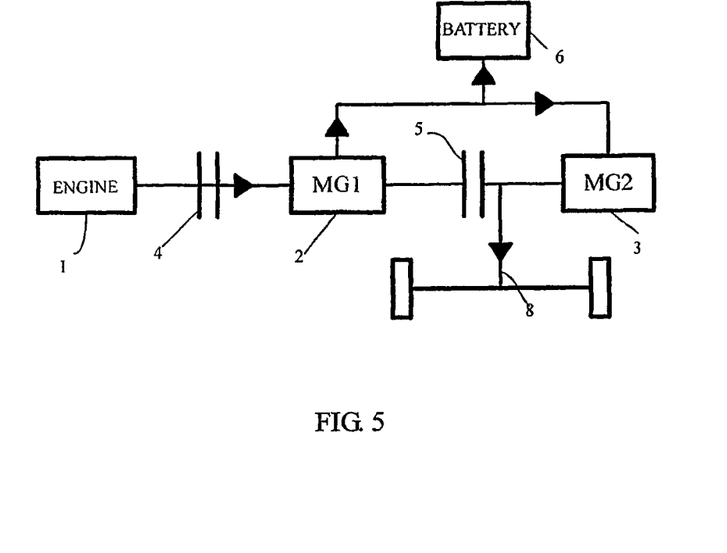
Figure 6:
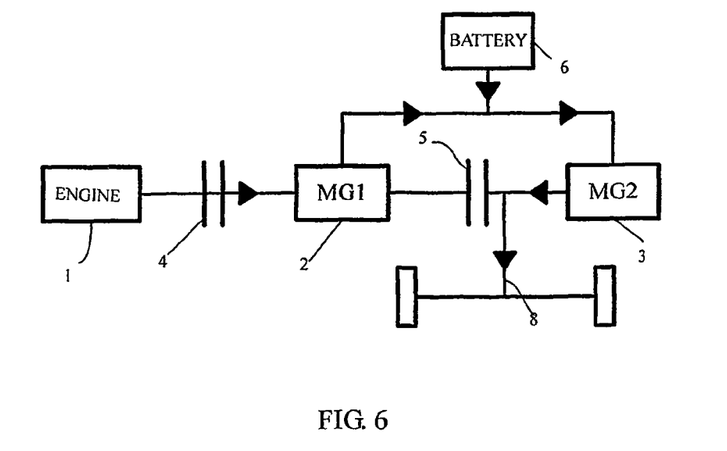

FIG. 4 shows the operation mode in which only the first motor 2 is operated to propelling the vehicle, at this time, the second clutch 5 is engaged, the second motor 3 is out-of-work or idle, the first motor 2 is operated under battery energy, the battery 6 provides the electrical energy for the first motor 2. As indicated by the arrow in FIG. 4, the battery 6 provides the electrical energy to the first motor 2, and the first motor 2 output the torque to the driving shaft 8 through the fixed ratio reduction unit 7. FIG. 5 and FIG. 6 show operation mode in which the engine 1 is operated, but the driving shaft 8 is only driven by the second motor 3, which is usually called as the series-hybrid operation mode.

During this mode, the second clutch 5 is disengaged, thus the mechanical connection between the first motor 2 (and the engine 1) and the driving shaft 8 is disconnected; the first clutch 4 is engaged, connecting the output shaft of the engine 1 with the rotating shaft of the first motor 2; the power from the engine 1 is transferred to the first motor 2, the first motor 2 is operated in the generating mode, the second motor 3 is operated in the electrical energy operation mode. As indicated by the arrow in FIG. 5, when the battery 6 is required to be charged, partial electrical energy from the first motor 2 is used to charge the battery 6, while the remain is transferred to the second motor 3, the second motor 3 provides the torque to the driving shaft 8 through the fixed ratio reduction unit 7. As indicated by the arrow in FIG. 6, the electrical energy from the first motor 2 is transferred to the second motor 3, the battery 6 also gives the electrical energy to the second motor 3, and the second motor 3 transfers the torque to the driving shaft 8 through the fixed ratio reduction unit 7.

Figure 7:
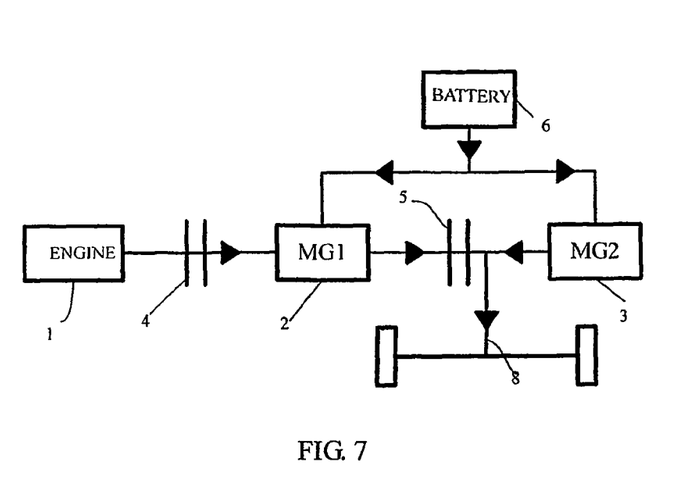
Figure 8:
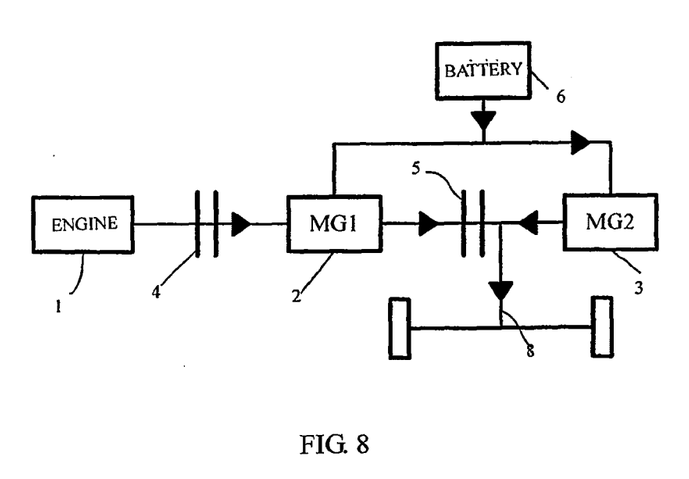

FIG. 7 and FIG. 8 show the operation mode in which the engine 1 is used to propel the driving shaft 8, and at the same time, the electrical energy from the battery 6 is also consumed to produce the drive force to the driving shaft 8, which is usually called as the parallel-hybrid operation mode.

During this mode, both the first clutch 4 and the second clutch 5 are engaged, thus enable the output shaft of the engine 1 mechanically connected with the rotating shaft of the first motor 2, enable the first motor 2 and the second motor 3 mechanically connected with the driving shaft 8. According to the different operation modes of the first and the second motors, the power can be flowed in different manners.

FIG. 7 shows the operation mode in which both the first motor 2 and the second motor 3 are working under the battery energy; the battery 6 provides the required electrical energy. As indicated by the arrow in FIG. 7, the engine 1 functions and transfers the torque to the driving shaft 8 through the rotating shaft of the first motor 2. According to the required drive torque, the first motor 2 and the second motor 3 may convert the electrical energy from the battery 6, and output the torque to the driving shaft 8.

FIG. 8 shows the operation mode in which the first motor 2 is idle, the second motor 3 operates under the battery energy; the battery 6 may provide the electrical energy as required. As indicated by the arrow in FIG. 8, the engine 1 functions to transmit the torque to the driving shaft 8 through the rotating shaft of the first motor 2. According to the drive torque as required, the second motor 3 may also receives the electrical energy from the battery 6 to provide torque to the driving shaft 8.

Figure 9:
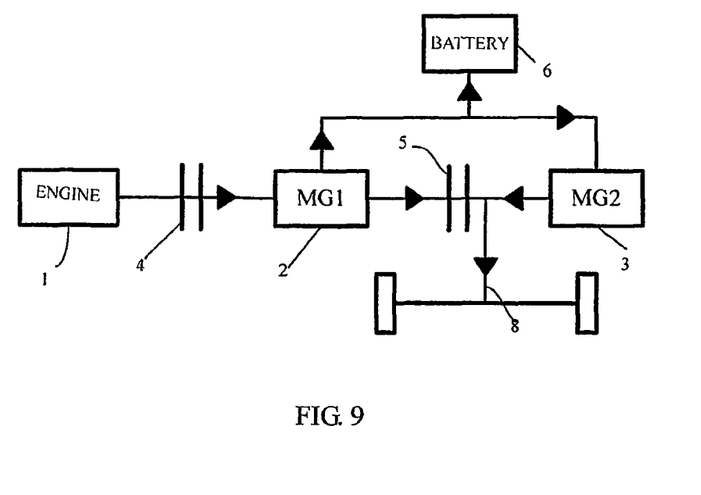
Figure 10:
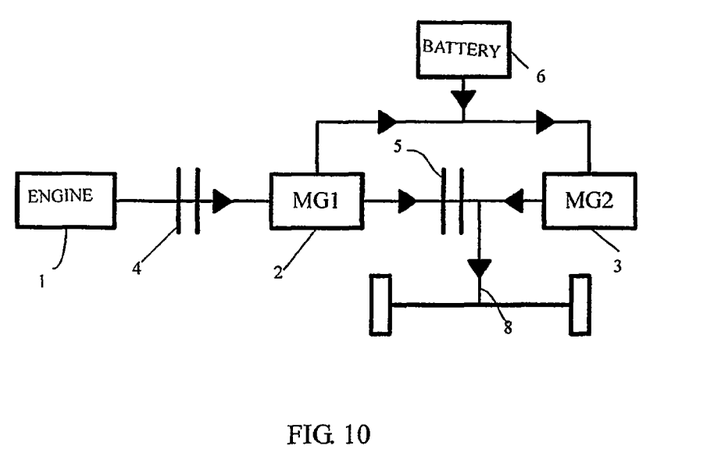

FIG. 9 and FIG. 10 show the operation mode in which the engine 1 output the power, the first motor 2 is generating the electricity, and the second motor 3 operates under the electrically driving mode, which is usually called as the series-parallel operation mode.

In this mode, partial power of the engine 1 is directly transferred to the driving shaft, the remain is used for driving the first motor 2 to work under the electricity-generating mode, and the second motor 3 is operating in the electrical energy mode. As indicated by the arrow in FIG. 8, partial electrical energy generated by the first motor 2 is directly transferred to the second motor 3, enable the second motor 3 electrically drive the wheels, and the remain is charging the battery 6. As indicated by the arrow in FIG. 9, the electrical energy generated by the first motor 2 is directly sent to the second motor 3, and the battery 6 also provides the electrical energy to the second motor 3, such that the second motor 3 electrically drive the wheels.

Figure 11:
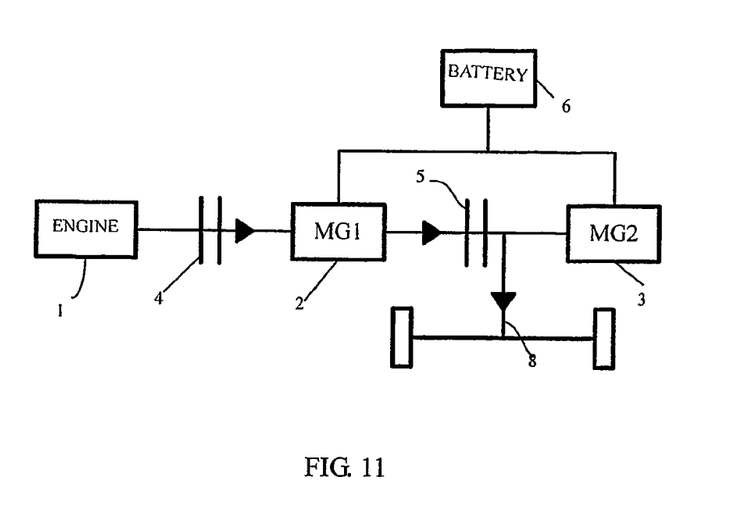
Figure 12:
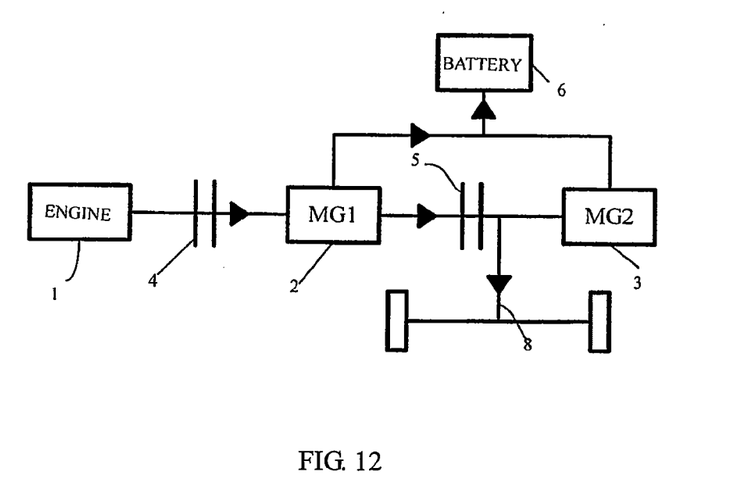

FIG. 11 and FIG. 12 show the operation mode in which the driving shaft 8 is only propelled by the engine 1, which is usually called as the purely engine operation mode, and at this time, both the first clutch 4 and the second clutch 5 are engaged.

FIG. 11 shows the operation mode in which both the first motor 2 and the second motor 3 are idle, and their rotating shafts are used to transfer the torque from engine 1 to the driving shaft 8. As indicated by the arrow in FIG. 11, the engine 1 functions and transfers the torque to the driving shaft 8 through the rotating shafts of the first motor 2 and the second motor 3.

FIG. 12 shows the operation mode in which the first motor 2 transfers partial power from engine 1 into electrical energy for charging the battery 6, and at the same time its rotating shaft transfers the remaining power from the engine 1 to the driving shaft 8. As indicated by the arrow in FIG. 12, the engine 1 starts, and a part of the power thereof is transferred to the driving shaft 8 through the rotating shaft of the first motor 2, and the other part of the power is converted into electrical energy by the first motor 2 and stored in the battery 6.

Figure 13:
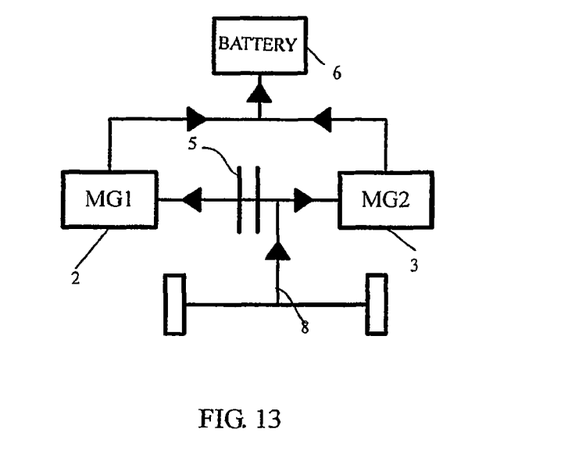
FIG. 13 and FIG. 14 are views illustrating various energy recover modes of the present hybrid power output system.
Figure 14:
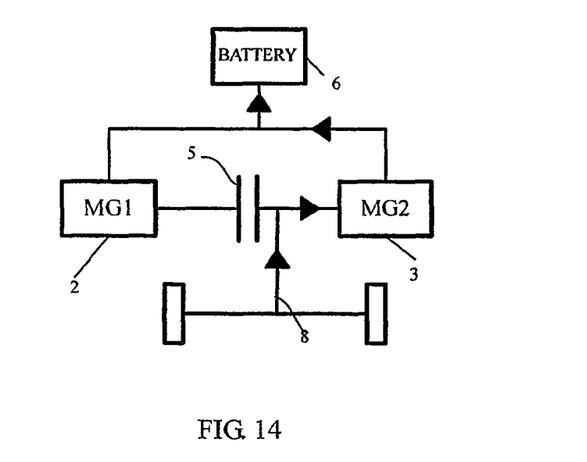

FIG. 13 and FIG. 14 are views illustrating the energy recover operation mode of the present invention.

When the vehicle is decelerating or braking, the present invention can be used to recover energy. In this mode, the motor works in electricity generating mode, and transfers the power feedback from the driving shaft 8 into the electrical energy for charging the battery 6. According to the engaged/disengaged status of the second clutch 5, the energy may be recovered in different manners.

FIG. 13 shows the energy recover mode in which the second clutch 5 is engaged. In this mode, the rotating shafts of both the first motor 2 and the second motor 3 are connected with the driving shaft 8, and the first motor 2 and the second motor 3 are working under the electricity generating mode, for storing the recovered electricity to the battery 6. As indicated by the arrow in FIG. 13, the driving shaft 8 feedbacks the mechanical energy from the wheels to the first motor 2 and the second motor 3, and the latter is operated to convert the mechanical energy into electrical energy for charging the battery 6 to realize the energy recover purpose.

FIG. 14 shows the energy recover mode in which the second clutch 5 is disengaged. In this mode, the rotating shaft of the second motor 3 is connected with the driving shaft 8, the second motor 3 is working under the electricity generating mode, for storing the recovered electrical energy to the battery 6. As indicated by the arrow in FIG. 14, the driving shaft feedbacks the mechanical energy from the wheels to the second motor 3, and the second motor 3 converts the mechanical energy into the electrical energy for charging the battery 6 to realize the energy recover purpose.

Figure 15:
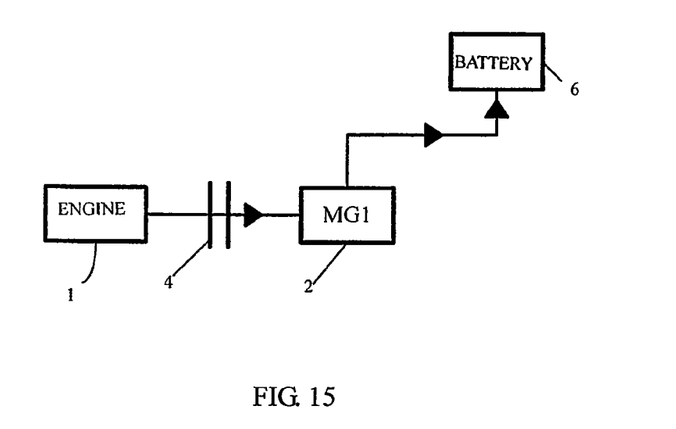
FIG. 15 is a view illustrating the state in which the present hybrid power output system is used for charging the battery when the vehicle is parking.

FIG. 15 is a view illustrating the operation mode in which the battery is charging while the vehicle is parking.

In this mode, the second clutch 5 is disengaged and the second motor 3 is stopped, the engine 1 drives the first motor 2 to work under the electricity generation mode, and stores the electrical energy into the battery 6. As indicated by the arrow in FIG. 15, the engine 1 starts to drive the first motor 2, and the first motor 2 is driven to convert the power from the engine 1 into the electrical energy for charging the battery 6.

Although the invention has been described with respect to specific embodiments, the details are not to be construed as limitations, for it will become apparent that various embodiments, changes and modifications may be resorted to without departing from the spirit and scope thereof, and it is understood that such equivalent embodiments are intended to be included within the scope of this invention.

The invention claimed is:

1. A hybrid power output system for a vehicle, comprising:
   a first motor;
   a second motor;
   a battery electrically connected to the first motor and the second motor;
   an engine;
   a first clutch operatively coupled between the engine and the first motor, the engine being directly connected to the first motor by the first clutch;
   a second clutch operatively coupled between the first motor and the second motor;
   a constant-mesh fixed ratio reduction unit arranged between the second clutch and the second motor, and configured to operatively couple the second motor to a wheel driving shaft, the first motor being directly connected to the constant-mesh fixed ratio reduction unit by the second clutch; and
   wherein the engine, the first clutch, the first motor, the second clutch, and the second motor are connected in sequence in a coaxial arrangement.

2. The system of claim 1, wherein the fixed ratio reduction unit is a constant-mesh gear-drive reduction unit, a constant-mesh chain-drive reduction unit, or a constant-mesh friction-drive reduction unit.

3. The system of claim 1, wherein the first motor is a mid-speed or a high-speed motor, and the second motor is a mid-speed or a low-speed motor.

4. The system of claim 1, wherein the first motor has sufficient output power so as to propel the vehicle without engaging the second motor, and the second motor has sufficient output power so as to propel the vehicle without engaging the first motor.

5. The system of claim 1, wherein the first motor and the second motor are configured to propel the vehicle simultaneously.

6. The system of claim 1, wherein an output power of the second motor is greater than an output power of the first motor.

7. The system of claim 1, wherein the first motor and the second motor are electrically connected to the battery, respectively, through a power converter.

8. A hybrid power output system, comprising
a first motor;
a second motor;
a battery electrically connected to the first motor and the second motor;
an engine;
a first clutch operatively coupled between the engine and the first motor, the engine being directly connected to the first motor by the first clutch;
a second clutch operatively coupled between the first motor and the second motor;
a constant-mesh fixed ratio reduction unit arranged between the second clutch and the second motor, and configured to operatively couple the second motor to a wheel driving shaft;
wherein the first motor is a mid-speed or a high-speed motor, and the second motor is a mid-speed or a low-speed motor;
wherein the first motor is directly connected to the constant-mesh fixed ratio reduction unit by the second clutch: and
wherein the engine, the first clutch, the first motor, the second clutch, and the second motor are connected in sequence in a coaxial arrangement.

9. The system of claim 8, wherein the constant-mesh fixed ratio reduction unit is a constant-mesh gear-drive reduction unit, a constant-mesh chain-drive reduction unit, or a constant-mesh friction-drive reduction unit.

10. The system of claim 8, wherein the first motor has sufficient output power so as to propel the vehicle without engaging the second motor, and the second motor has sufficient output power so as to propel the vehicle without engaging the first motor.

11. The system of claim 8, wherein the first motor and the second motor are configured to propel the vehicle simultaneously.

12. The system of claim 8, wherein an output power of the second motor is greater than an output power of the first motor.

13. The system of claim 8, wherein the first motor and the second motor are electrically connected to the battery, respectively, through a power converter.

\* \* \* \* \*

UNITED STATES PATENT AND TRADEMARK OFFICE
CERTIFICATE OF CORRECTION

PATENT NO. : 8,540,601 B2  
APPLICATION NO. : 12/518206  
DATED : September 24, 2013  
INVENTOR(S) : Chuanfu Wang et al.

It is certified that error appears in the above-identified patent and that said Letters Patent is hereby corrected as shown below:

In the Claims

In column 9, claim 8, line 13, immediately after "system, comprising" insert --:--.

In column 10, claim 8, line 6, immediately after "clutch" replace ":" with --;--.

Signed and Sealed this
First Day of July, 2014

Michelle K. Lee
*Deputy Director of the United States Patent and Trademark Office*